US009043142B2

(12) United States Patent
Hünig

(10) Patent No.: US 9,043,142 B2
(45) Date of Patent: May 26, 2015

(54) NAVIGATION GUIDANCE SYSTEM

(75) Inventor: Daniel Hünig, Tubingen (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 449 days.

(21) Appl. No.: 13/419,049

(22) Filed: Mar. 13, 2012

(65) Prior Publication Data

US 2012/0259542 A1    Oct. 11, 2012

(30) Foreign Application Priority Data

Apr. 11, 2011  (EP) .................................... 11161867

(51) Int. Cl.
 *G01C 21/00*  (2006.01)
 *G01C 21/34*  (2006.01)
 *G01C 21/36*  (2006.01)

(52) U.S. Cl.
 CPC ............ *G01C 21/3415* (2013.01); *G01C 21/00* (2013.01); *G01C 21/3626* (2013.01)

(58) Field of Classification Search
 CPC ...................................................... G01C 21/00
 See application file for complete search history.

(56) References Cited

U.S. PATENT DOCUMENTS

| 5,243,528 | A | 9/1993 | Lefebvre | 364/449 |
|---|---|---|---|---|
| 5,311,434 | A | 5/1994 | Tamai | 364/449 |
| 8,635,017 | B2 * | 1/2014 | Geelen et al. | 701/411 |
| 2005/0261829 | A1 | 11/2005 | Furukawa | 701/210 |
| 2006/0111836 | A1 | 5/2006 | Fast et al. | 701/210 |
| 2007/0276596 | A1 | 11/2007 | Solomon et al. | |

FOREIGN PATENT DOCUMENTS

| DE | 102007061706 A1 | 7/2009 | G01C 21/34 |
|---|---|---|---|
| EP | 0854352 A2 | 7/1998 | G01C 21/20 |

OTHER PUBLICATIONS

European Search Report dated Jul. 15, 2013, pp. 1-6, European Patent Application No. 11 161 867.4-1557, European Patent Office, Rijswijk, Netherlands.
European Search Report issued in European Application No. 11161867.4 dated Sep. 21, 2011, 6 pgs.

* cited by examiner

*Primary Examiner* — John Q Nguyen
*Assistant Examiner* — Michael Kerrigan
(74) *Attorney, Agent, or Firm* — Artegis Law Group, LLP

(57) ABSTRACT

A navigation system may calculate a route to a destination and output guidance information with an output device to guide a user of the navigation system along the calculated route. If it is determined that a navigation device has left the calculated route, the navigation system may prompt the user asking whether output of guidance information should be suspended. If the output of guidance information should be suspended, the navigation system may suspend the output of guidance information and calculate a new route to the destination while the output of guidance information is suspended. The navigation system may calculate an estimated arrival time at the destination based on the calculated new route and output the estimated arrival time while the output of guidance information is suspended.

24 Claims, 3 Drawing Sheets

NAVIGATION GUIDANCE SYSTEM

BACKGROUND OF THE INVENTION

1. Priority Claim

This application claims the benefit of priority from European Patent Application No. 11 161 867.4, filed Apr. 11, 2011, which is incorporated by reference.

2. Technical Field

The present invention relates to a system for guiding a user of a navigation device on a calculated route to a destination, and to a navigation device adapted to guide a user on a calculated route to a destination.

3. Related Art

Navigation systems or navigation devices for guiding a user from a starting position, for example, a current position of the user, to a destination position are well-known in the art. After having calculated a route from the starting position to the destination position, guidance information may be output to the user by optical and/or acoustical means. For example, a map indicating a current position of the user and a route may be displayed on a display of the navigation device. Furthermore, directional instructions may be output on the display or as acoustic information instructing the user where and when to make a turn. If the user leaves the route, the navigation system may calculate a new route. The new route may include either a short way back to the original route or a completely new route. For example, the user may leave the calculated route for having a break or going into a restaurant or shopping or if a route block occurs. If a route block occurs, for example, due to construction work or an accident, the user may take an alternative turn in contradiction to the directional instructions of the navigation system. In this case the navigation system may direct the user back to the original route. This may lead to the situation that the system takes the user back to the beginning of the route block over and over again. Further, if the user is leaving the route for a break or shopping, acoustic guiding information output by the navigation system guiding the user back to the route may be annoying.

SUMMARY

A navigation system may calculate a route to a destination and output guidance information with an output device to guide a user of the navigation system along the calculated route. If it is determined that the user has left the calculated route, the navigation system may ask the user whether output of guidance information should be suspended. If the output of guidance information should be suspended, the navigation system may suspend the output of guidance information and calculate a new route to the destination while the output of guidance information is suspended. The navigation system may calculate an estimated arrival time at the destination based on the calculated new route and output the estimated arrival time while the output of guidance information is suspended.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
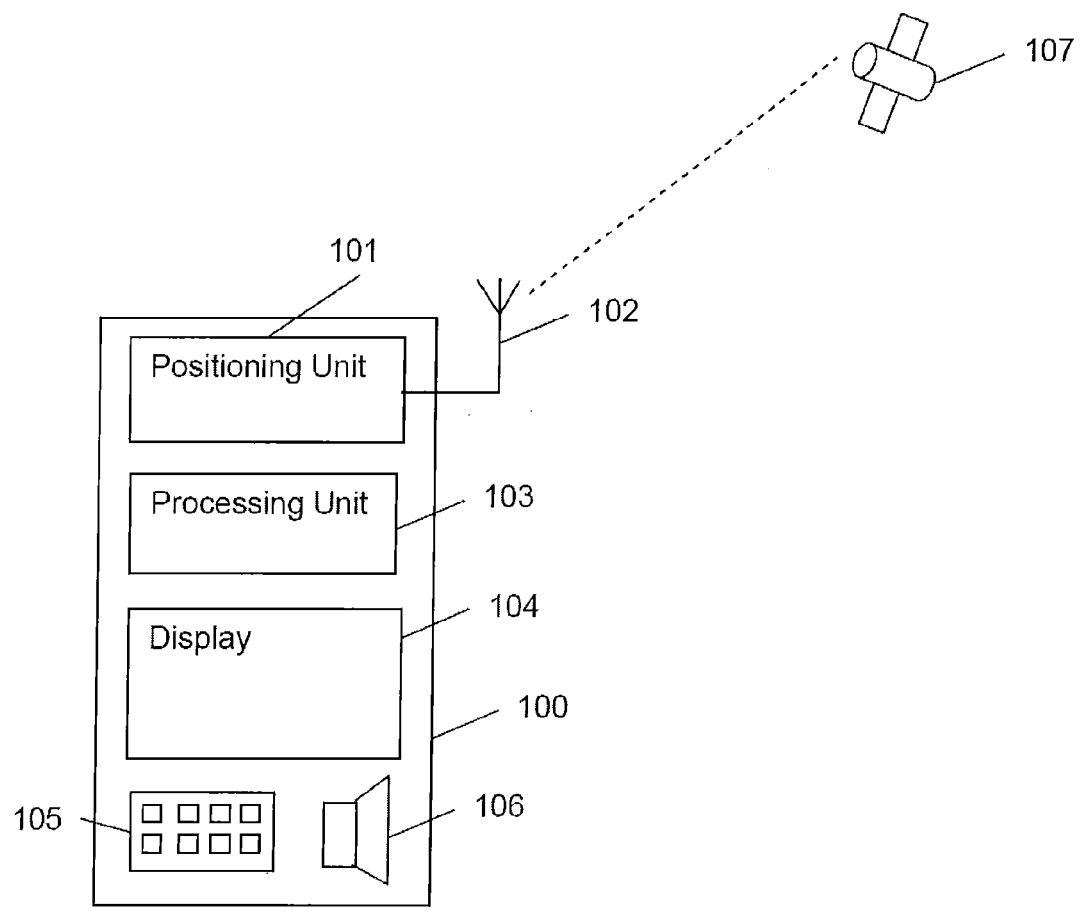
FIG. 1 shows a schematic view of one example of a navigation system.

In one example, a system for guiding a user of a navigation device on a calculated route to a destination is provided. Guidance information may be output to a user to guide the user along the calculated route. Based on a current position of the navigation device, it may be determined if the user has left the calculated route. If the user has left the calculated route, the user may be asked whether guidance by the navigation system should be suspended. If the user confirms that the guidance by the navigation system should be suspended, an output of guidance information to the user may be suspended for a predetermined time period. The predetermined time period may be a limited time period, for example, a few minutes (e.g., 5 minutes).

If the user leaves the calculated route, for example, for driving to a sightseeing point, for making a break at a gas station or a restaurant, for detouring a blocking of the road ahead (e.g., due to a congestion, an accident, or a construction), or for detouring from the calculated route to make a stop at a well-known address, the output of guidance information may be suspended for a predetermined time. Thus, the user may not be annoyed by the navigation system outputting guidance information, which may increase the comfort when using the navigation device. In addition, the navigation system may continue to display a map of the area in which the user is traveling without overlaying navigation system guidance, or additional navigation system guidance. Also, points of interest, two or three dimensional views of landmarks, and other map related features may continue to be provided by the navigation system during the time the navigation system guidance to the destination is suspended. Thus, the user may continue to use the navigation system map while guidance along the calculated route is suspended, and the suspended calculated route to the destination may continue to be visually included in the map display, such as by providing a contrasting colored line along the calculated route.

In one example, the step of asking the user whether the guidance by the navigation device should be suspended may include the following steps. First, a question may be output to the user asking whether the guidance by the navigation system should be suspended. Outputting a question to the user asking whether the guidance by the navigation system should be suspended may include displaying or otherwise outputting a prompt for user input regarding whether output of the guidance information should be suspended. Then the navigation system may wait for a predetermined answering time period for an answer from the user. In other words, the navigation system may wait for a predetermined answering time period for a signal indicative of user input. If no answer is received within the answering time period, the navigation system may determine that the guidance by the navigation system should be suspended. If an answer is received within the answering time period, the guidance by the navigation system may be suspended or not according to the received answer (i.e., according to the signal indicative of user input). The answering time period may be, for example. 5 seconds. Thus, if the user does not answer within the answering time period of 5 seconds, the guidance by the navigation system may be automatically suspended, and the output of guidance information to the user may be suspended for the predetermined time period. In other words, the user may answer the question, but if the user does not answer within the answering time period, it may be automatically assumed that the guidance should be suspended for the predetermined time period. This may simplify usage of the navigation system as less user interaction is necessary.

In one example, operation of the navigation system may include the following steps. First, the navigation system may determine whether the predetermined time period has expired. Then, if it has been determined that the predetermined time period has expired, the user may be asked whether the guidance by the navigation system should be continued. If the user confirms that the guidance by the navigation system should not be continued (i.e., that the guidance by the navigation system should be suspended), an output of guidance information to the user may again be suspended for the predetermined time period. Thus, the output of guidance information can be easily continued or suspended again after the predetermined time period. The predetermined time period may be configurable by the user. Additionally, or alternatively, the predetermined time period may be configurable to an infinite value, and thus the output of guidance information may be reactivated by a user command, as will be described in more detail later.

The step of asking the user whether the guidance by the navigation system should be continued may include the following steps. When the predetermined time period has expired, a question may be output to the user (e.g., a prompt for user input may be displayed or otherwise output) asking whether the guidance by the navigation system should be continued. Then, the navigation system may wait for an answer from the user (e.g., a signal indicative of user input) for a predetermined answering time period. The answering time period may be in the range of a few seconds (e.g., 5 seconds). If no answer is received within the answering time period, the navigation system may assume that the guidance by the navigation system should be continued. If an answer is received from the user within the answering time period, the guidance by the navigation system may be continued or not depending on the received answer. Thus, the user may easily continue the guidance or suspend the guidance by answering the question. Additionally, or alternatively, the guidance may be automatically reactivated by the navigation system if the user does not answer. Thus, when the user leaves the calculated route, the output of guidance information may be suspended automatically for a predetermined time period and, after the predetermined time period, output of guidance information may be automatically continued if the user does not answer the questions from the navigation system. This may be advantageous in most use cases when the user is leaving the calculated route, for example when the user is leaving the calculated route for a short time, such as to take a rest break or to circumnavigate a blocked road.

In one example, a route to the destination may be calculated, and guidance information for guiding the user along the calculated route may be output if the user confirms that the guidance by the navigation system should be continued. Thus, an appropriate route to the destination and corresponding guidance information can be provided to the user.

The interaction between the navigation system and the user may include an output of visual and/or acoustic information and an input of haptic and/or acoustic information. For example, the questions described above may include a visual output on a display of the navigation system and/or acoustic information output via a loudspeaker system of the navigation system as spoken language. The user may answer to the questions by spoken language which is received via a microphone of the navigation system and/or the user may actuate an input device of the navigation system such as, for example, a control knob or a touchscreen.

The guidance information output to the user may include, for example, displaying of a map on which a current position of the user and a route to the destination are displayed. The guidance information may include driving instructions which are displayed on the display of the navigation system and/or which may be output as acoustic spoken language by loudspeakers of the navigation system. The driving instructions may include instructions such as, for example, "take the next exit" or "turn left". Suspending the output of guidance information to the user may include suspending, or inhibiting, displaying of the calculated route on the map and/or suspending, or inhibiting, an output of these driving instructions. In one example, the map may still be displayed showing the current position of the vehicle but without displaying the route to the destination. In another example, the route to the destination may be displayed while the output of guidance information is suspended. For example, the route to the destination may be displayed on the map while the audible output of guidance information (e.g., output with the loudspeaker of the navigation device) may be suspended, or inhibited. In another example, the route to the destination may be displayed on the map while the visual output of guidance information (e.g., driving instructions) may be suspended, or inhibited, during suspension of the output of guidance information.

In one example, a route to the destination may be calculated during the predetermined time period during which the output of guidance information to the user is suspended. In other words, a route to the destination may be calculated based on the current position of the user while the output of guidance information to the user is suspended. The calculated route to the destination may be updated or recalculated (e.g., based on the passage of time and/or changes in the current position of the user) while the output of guidance information to the user is suspended. The calculation of the new route may take place in the background. In other words, the calculated new route may not be displayed by the navigation system, and the guidance information for guiding the user on the calculated new route may not be outputted to the user.

Based on the calculated route, an estimated arrival time at the destination may be calculated, and the estimated arrival time may be displayed on a display of the navigation system. In other words, by calculating the route to the destination while the output of guidance information to the user is suspended, the estimated arrival time may be updated or maintained during suspension of the output of guidance information. The estimated arrival time may be configured as a time of day (e.g., 3:15 pm), a time that will elapse prior to arrival at the destination (e.g., 1 hour, 37 minutes), or a distance to the destination along the calculated route. Thus, although during the predetermined time period no guidance information is output to the user, the estimated arrival time at the destination may still be displayed. Assuming that the user wishes to continue to drive to the destination, although the user has left the calculated route for certain reasons as explained earlier, the user may still be informed about the estimated arrival time at the destination. Additionally, or alternatively, when a command from the user to terminate suspension of the output of guidance information is received or the time period for suspending the output of guidance information is exceeded, guidance information may be output immediately as the route to the destination has already been calculated in the background.

In one example, the mode of the navigation system in which the output of guidance information is suspended may be activated based on a user command without departing from the calculated route. For example when the user is driving on a user-known route to a destination, the output of guidance information may be suspended while the estimated arrival time may be displayed and updated.

In one example, operation of a navigation system may include the following steps. The navigation may receive a signal indicative of a command from the user to terminate suspension of the output of guidance information. In response to the received signal, a route to the destination may be calculated, and corresponding guidance information for guiding the user along the calculated route may be output. The command for terminating suspension of the output of guidance information may be entered into the navigation system by spoken language from the user and/or by actuating an operating device of the navigation system. By terminating the mode of the navigation system in which the output of guidance information is suspended, the user may reactivate the guidance by the navigation system on demand without entering the destination again and starting the guiding by the navigation system again.

In one example, asking the user whether a guidance by the navigation system should be suspended may include asking the user whether the route ahead is blocked or asking the user whether leaving the calculated route is intended. Based on an answer to this question, a route calculation to the destination may be influenced and/or the predetermined time period during which the output of guidance information to the user is inhibited may be influenced. For example, if the user answers that the route ahead is blocked or that leaving the calculated route is intended, the predetermined time period may be increased to give the user more time to circumnavigate the blockage or to make a stop. In another example, if the user answers that the route ahead is blocked or that leaving the calculated route is intended, the predetermined time period may be decreased.

In one example, a navigation system may include a positioning unit adapted to determine a current position of the navigation device (e.g., a current position of a user and/or a current position of a vehicle), a user interface adapted to output information to a user of the navigation system and to receive information from the user, and a processing unit. The processing unit may be adapted to calculate a route to a destination and to generate and output guidance information for guiding the user along the calculated route. Based on the current position of the navigation device, the processing unit may determine if the user is leaving the calculated route. If the user is leaving the calculated route, the processing unit may output a question to ask the user whether guidance by the navigation system should be suspended. If the user confirms, for example, by inputting an answer to the question, that the guidance by the navigation system should be suspended, the processing unit may suspend an output of guidance information to the user for a predetermined time period. The navigation system may be adapted to perform a method of any of the examples described throughout this disclosure.

The navigation system may include a mobile personal navigation device or a navigation device of a vehicle, such as an automobile, a boat, an airplane, or any other passenger carrying conveyance. The mobile personal navigation device may be a hand-held device which may be used inside and/or outside a vehicle. The navigation device of the vehicle may include a navigation device installed in a vehicle or may be part of an entertainment system or computer system of the vehicle. In one example, the navigation system may determine the current position of the user by determining the current position of the navigation device.

It is to be understood that the features of the various examples described herein may be combined with each other unless specifically noted otherwise. However, describing an example with a plurality of features is not to be construed as indicating that all of those features are necessary for practicing the present invention, as other examples may include fewer features and/or alternative features.

FIG. 1 shows one example of a navigation system 100 including a positioning unit 101 connected to an antenna 102, a processing unit 103, a display 104, an input device 105 and a loudspeaker 106. The navigation system 100 may be a stand-alone navigation device. The navigation system 100 may include and/or be interfaced to various devices and/or systems. In addition, in other examples, the functionality of the navigation system 100 may be distributed such that a portion of the navigation system may be included in a user navigation device that moves with a user, and a portion of the functionality of the navigation system may be external to the navigation device, such as located in a server, a vehicle, or in any other computing system. The positioning unit 101 may determine the position of a user, such as a user traveling in a vehicle in which at least part of the navigation system 100 may be installed or operated. For example, the positioning unit 101 may include a global positioning system (GPS) receiver or a comparable satellite positioning system receiver for receiving positioning signals from navigation satellites. In other examples, the positioning unit may be any other form of mobile positioning system, such as a beacon system, an angle of arrival system, an arrival time system, or any combination thereof. A digital map representation, as well as operating instructions and any other data or instructions related to the navigation system 100 may be stored in a database and/or any other memory or memory device. The database may include, for example, one or more of a hard disk device, a CD-ROM device, a DVD device, a ROM memory device, or any other one or more non-transitory data storage devices. In addition, rewritable non-volatile memory, such as flash memory, may be provided to store data and information in a flexible way and/or to maintain the stored information even in the case of a power outage.

The processing unit 103 may perform operation aspects of the navigation system 100, such as providing navigation information (i.e., visual and/or audio output) to the vehicle user (e.g., the driver). The processing unit 103 may be configured to include a general processor, a digital signal processor, application specific integrated circuit, field programmable gate array, analog circuit, digital circuit, server processor, combinations thereof, or other now known or later developed processor. The processing unit 103 may be configured as a single device or combination of devices, such as associated with a network or distributed processing. Any of various processing strategies may be used, such as multi-processing, multi-tasking, parallel processing, remote processing, centralized processing or the like. The processing unit 103 may be responsive to or operable to execute instructions stored as part of software, hardware, integrated circuits, firmware, micro-code, or the like.

The navigation system 100 may include various output devices to present or annunciate the navigation information to the user. The output devices may include the display 104 and/or the loudspeaker 106. In one example, the display 104 may include a touchscreen adapted to display information to a user of the navigation system 100 and adapted to receive inputs from a user of the navigation system 100 touching operating areas displayed on the display 104. The display 104 may be a full graphic display, such as, for example, a liquid-crystal display, a thin-film transistor display, or a cathode-ray tube display. Additionally, or alternatively, the display 104 may be a projection display, such as a head-up display in which optical information may be projected onto a windscreen, or other surface of the vehicle. The display 104 may be combined with one or more input devices. For example, the display 104 may be configured as a touchscreen device. The display 104 may be a dedicated component of the navigation system 100 or may be used together with other vehicle systems, such as, for example, a multi-media system. The loudspeaker 106 may be adapted to output speech information or spoken language to the user. The loudspeaker 106 may be a dedicated component of the navigation system 100. Alternatively, the loudspeaker 106 may be included in an audio system of a vehicle in which the navigation system 100 is installed. For example, the loudspeaker 106 may be a component of a vehicle entertainment system, such as a car radio, CD player, MP3 player, tape player, or a combination of such devices. If the navigation system 100 shares use of the loudspeaker 106 with a vehicle entertainment system, the navigation system 100 may include an interface to permit transmission of the output signals corresponding to navigation information to the vehicle entertainment signal. This may be accomplished via a communication link such as a digital data bus in the vehicle.

Additionally, or alternatively, the navigation system 100 may include an input device 105. The processing unit 101 may be coupled to the input device 105 to provide the user with control over functions of the processing unit 103. The input device 105 may include suitably designed switches, buttons, a microphone for receiving speech information from the user, a keyboard, and/or any other mechanism or technique for inputting information to the navigation system 100. For example, the input device 105 may be configured as a series of user selectable inputs, such as a key pad as shown in FIG. 1.

In operation the positioning unit 101 may receive positioning information via the antenna 102 from, for example, a satellite 107 of a global positioning system like GPS or Galileo. The positioning unit 101 may be coupled to components of a vehicle in which the navigation device 100 is installed, for example, to a tachometer or a steering angle sensor. Based on the received information, the positioning unit 101 may provide a global position information of the navigation device 100 to the processing unit 103. The processing unit 103 may include or may have access to maps and may be adapted to calculate a route to a user-defined destination from a user-defined starting point or from a current position determined by the positioning unit 101. The processing unit 103 may further be adapted to display a map and a calculated route together with a current position of the navigation device 100 on the display 104. The processing unit 103 may be adapted to determine driving instructions for guiding the user along the calculated route. The driving instructions may include acoustic and/or visual information indicating next maneuvers to be done by the user for following the calculated route. The driving instructions may be displayed on the display 104 and/or may be output as speech information via the loudspeaker 106.

Figure 2:
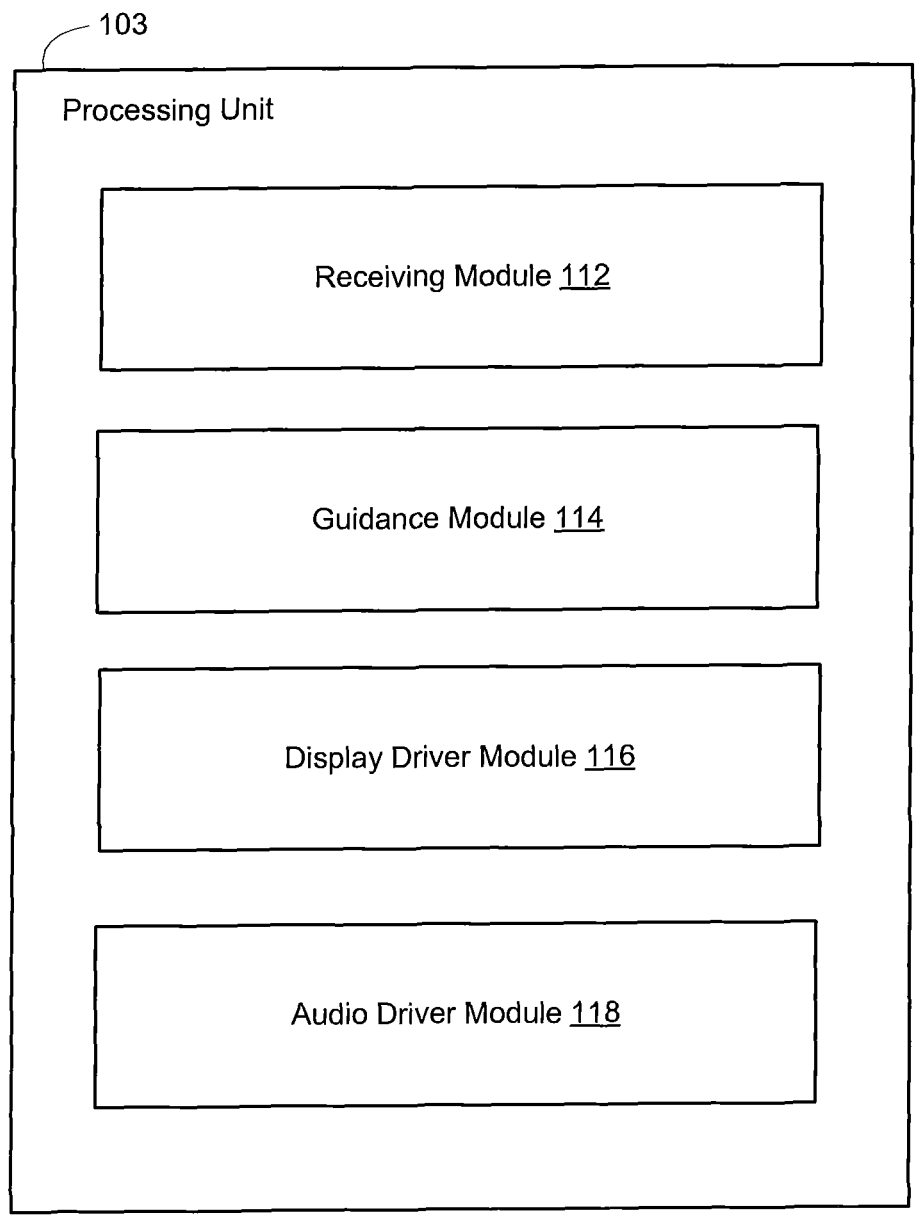
FIG. 2 shows one example of a processing device.

In one example, as shown in FIG. 2, the processing unit 103 may execute a receiving module 112 configured to receive position information from the positioning unit 101, geographic data (e.g., maps) from the database, and/or vehicle information from, for example, the tachometer or the steering angle sensor. The processing unit 103 may include a guidance module 114 configured to calculate the route to the user-defined destination. The processing unit 103 may include a display driver module 116 configured to present an appropriate output on the display 104 and/or an audio driver module 118 configured to send an appropriate output to the loudspeaker 106. The term "module" may be defined to include one or more executable modules. As used herein, the terms "module" and "unit" may be used interchangeably. As described herein, the modules are defined to include software, hardware or some combination thereof executable by a processing unit (e.g., the processing unit 103). Software modules may include instructions stored in the database, or any other memory device, that are executable by the processing unit 103 or any other processor. Hardware modules may include various devices, components, circuits, gates, circuit boards, and the like that are executable, directed, and/or controlled for performance by the processing unit 103, or any other processor.

Operation of the navigation system 100 will now be described in more detail with reference to FIG. 3.

Figure 3:
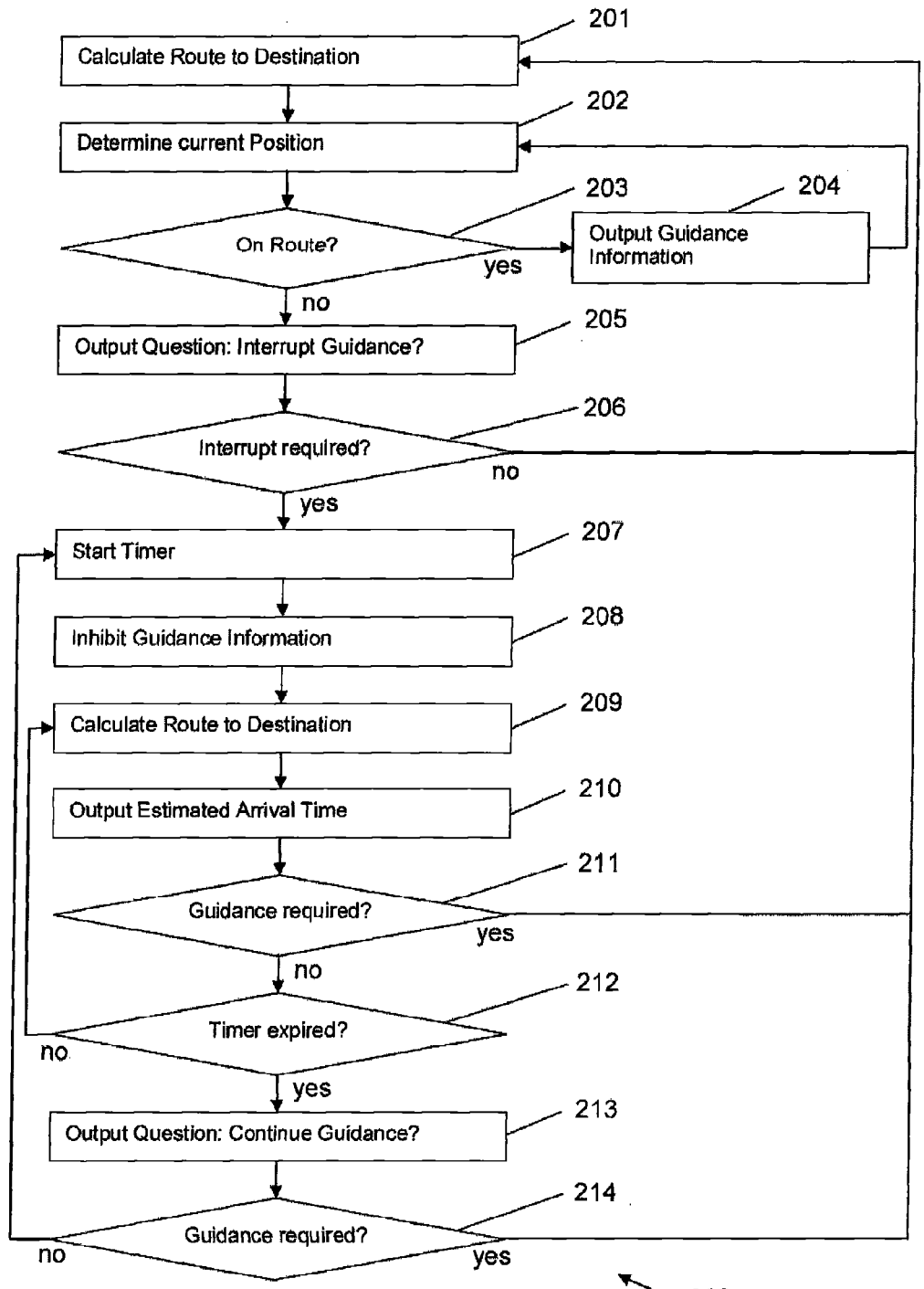
FIG. 3 shows a flowchart of one example of a method for guiding a user of a navigation system on a calculated route to a destination.

FIG. 3 shows a flow chart 200 including one example of method steps 201-214, which may be performed by the navigation system 100. After the user has entered a destination via the input device 105 (e.g., a touchscreen of the display 104 or the key pad or via speech received by the microphone of the navigation system 100), in step 201 a route from the current position to the destination may be calculated. In step 202, the current position of the navigation device 100 may be determined, and in step 203, it may be determined based on the current position if the navigation device 100 is still on the calculated route. If the navigation device 100 is still on the route, in step 204, guidance information may be output to the user if necessary and the method may continue in step 202.

If, in step 203, it is determined that the navigation device 100 is not on the calculated route anymore, which means that the user has left the calculated route, a question may be output to the user at step 205 asking if the user wants to suspend the output of guidance information. The user may answer this question by activating corresponding controls on the input device 105 (e.g., the key pad or the touch-sensitive surface of the display 104 or by speech input). If the user does not give any answer within a predetermined answering time of, for example, a few seconds (e.g., 5 seconds), it may be assumed that the user wishes to suspend the output of guidance information. Therefore, depending on the reaction of the user at step 206, the method may be continued in step 201 with recalculating a route to the destination if the user does not want to suspend the output of guidance information, or the method may be continued in step 207 if the user wants to suspend the output of guidance information.

In step 207 a timer may be started. The timer may be realized in the processing unit 103 and may be adapted to determine a predetermined time period after the timer has been started. The predetermined time period may be configurable by the user during a setup procedure of the navigation system 100 or at any other appropriate point in time. Next, in step 208, the currently output guidance information on the map of the display 104 may be removed. Additionally, or alternatively, any output of guidance information may be suspended, or inhibited. For example, an acoustic output of guidance information may be suspended. In another example, the display may continue to output guidance information on the map while acoustic output of guidance information may be suspended. In step 209, as the user has left the calculated route, and the calculated route is therefore not valid anymore, a route to the destination may be recalculated. The route to the destination may be recalculated by determining the current position of the navigation device and calculating a route from the current position to the destination. Based on the recalculated route to the destination, an estimated arrival time at the destination may be calculated and output on the display 104 in step 210.

In step 211, it may be determined if the user has requested to switch on an output of guidance information, which means that the user wants to terminate the suspension of the output of guidance information. The user may enter this request by activating a corresponding control on the input device 105 (e.g., the key pad or the touch-sensitive surface of the display 104 or by a speech input). If such a request to resume the output of guidance information is received in step 211, the method may be continued in step 201 where a route to the destination may be recalculated. Else, the method may be continued in step 212. If the user has not requested to switch on the output of guidance information, the navigation system 100 may recalculate the route to the destination and/or the estimated arrival time at the destination and may update the estimated arrival time output on the display 104. In this manner, the navigation system may continue to output the estimated arrival time at the destination to the user even though the output of guidance information may be suspended.

In one example, the user may continue to use the navigation system map while the output of guidance information is suspended. For example the navigation system may display the map of the area surrounding the current position of the user while the output of guidance information is suspended. The user may use the displayed map, which may include landmarks, points of interest (e.g., restaurants, hotels, gas stations, etc.), or other features, to aid in navigating to a desired location. Additionally, or alternatively, the calculated route to the destination from the current position of the user may be displayed on the map while the output of guidance information is suspended. In other words, the calculated route may be displayed (e.g., by showing a road or other path on the displayed map in a highlighted or contrasting color) even though the output of guidance information (e.g., visual or audible instructions such as "turn left" or "turn right") may be suspended. In this manner, the suspended calculated route to the destination may continue to be visually included in the map display, such as by providing a contrasting colored line along the calculated route, even though the output of guidance information may be suspended.

In step 212, the processing unit 203 may determine if the timer started in step 207 has expired, which means that the predetermined time period is over. If the timer has not expired, the method may be continued in step 209. Else, in step 213, a question may be output to the user asking if the route guidance should be resumed (i.e., if the suspension of the output of guidance information should be terminated). This question may be answered by the user by activating corresponding controls of the input device 105 (e.g., the key pad or the touch-sensitive surface of the display 104 or by answering the question via speech). If the user does not answer the question within a predetermined answering time period of, for example, a few seconds (e.g., 5 seconds), the processing unit 103 may assume that the user wishes to resume the route guidance. Depending on the answer or the assumed answer from the user at step 214, the method may be continued in step 201 or in step 207. For example, the method may be continued in step 201 in which the route to the destination may be recalculated and guidance information may be output if the user wishes to resume the route guidance. The method may be continued in step 207 in which the timer may be restarted and no route guidance information is output if the user decided that a route guidance is still not desired. If route guidance is still not desired, the navigation system 100 may continue to recalculate the route to the destination and/or the estimated arrival time at the destination as described earlier and to output the estimated arrival time at the destination to the user while the output of guidance information is suspended.

While various examples have been described above, various modifications may be implemented in other examples. For example, the method may be performed by a hand-held mobile device outside a vehicle for guiding a user who is walking or hiking or driving a bicycle. Furthermore, the positioning unit 101 may determine a current position of the navigation system 100 based on other information than satellite-based information, for example based on information from a mobile telecommunication network.

Finally, it is to be understood that all the examples described above are considered to be included by the present invention as it is defined by the appended claims. As already emphasized, the above-described examples serve only as illustrative examples, and the scope of the present invention is not limited to these examples, but it is intended to be limited only by the appended claims and equivalents thereof.

While various examples of the invention have been described, it will be apparent to those of ordinary skill in the art that many more examples and implementations are possible within the scope of the invention. Accordingly, the invention is not to be restricted except in light of the attached claims and their equivalents.

I claim:

1. A method for providing guidance information with a navigation system, the method comprising the steps of:
   calculating a route to a destination;
   outputting the guidance information with an output device of the navigation system to guide a user of the navigation system along the calculated route;
   determining, based on a current position of a navigation device of the navigation system, if the navigation device has left the calculated route;
   outputting, in response to determining that the navigation device has left the calculated route, a prompt for user input whether output of guidance information with the output device of the navigation system should be suspended;
   suspending the output of guidance information;
   calculating a new route to the destination substantially concurrently with suspension of the output of guidance information;
   calculating an estimated arrival time at the destination based on the calculated new route; and
   outputting the estimated arrival time with the output device of the navigation system substantially concurrently with suspension of the output of guidance information.

2. The method of claim 1, where suspending the output of guidance information comprises suspending the output of guidance information with the output device of the navigation system in response to receipt of a signal indicative of confirmation from the user that the output of guidance information with the output device of the navigation system should be suspended.

3. The method of claim 1, where suspending the output of guidance information comprises suspending the output of guidance information with the output device of the navigation system in response to expiration of a finite predetermined answering time period after outputting the prompt for user input whether output of the guidance information with the output device of the navigation system should be suspended.

4. The method of claim 1, where suspending the output of guidance information comprises suspending the output of guidance information with the output device of the navigation system until one of expiration of a unite predetermined time period or receipt of a signal indicative of a request from the user for termination of the suspension of the output of guidance information.

5. The method of claim 1, further comprising the steps of:
determining if a predetermined time period has expired after the step of suspending the output of guidance information;
outputting a second prompt for user input in response to determining that the predetermined time period has expired, the second prompt for user input being a request for user input whether the output of guidance information with the output device of the navigation system should be continued; and
waiting for a finite predetermined answering time period to receive a signal indicative of a user input after outputting the second prompt for user input.

6. The method of claim 5, further comprising suspending the output of guidance information for a second predetermined time period in response to receipt of the signal indicative of user input confirming that the output of guidance information with the output device of the navigation system should not be continued.

7. The method of claim 5, further comprising outputting guidance information with the output device of the navigation system in response to receipt of the signal indicative of user input that the output of guidance information with the output device of the navigation system should be continued to guide the user along the calculated new route.

8. The method of claim 5, further comprising the steps of:
determining that the output of guidance information by the output device of the navigation device should be continued in response to no receipt of the signal indicative of user input within the answering time period; and
outputting guidance information with the output device of the navigation system in response to determining that the output of guidance information by the output device of the navigation device should be continued.

9. The method of claim 5, further comprising determining the predetermined time period based on a corresponding input received from the user.

10. The method of claim 1, further comprising the steps of:
determining that the output of guidance information with the output device of the navigation system should not be suspended based on receipt of a signal indicative of user input confirming that the output of guidance information with the output device of the navigation system should not be suspended;
calculating a revised route to the destination; and
outputting guidance information with the output device of the navigation system to guide the user along the calculated revised route.

11. The method of claim 1, where outputting a prompt for user input comprises:
outputting the prompt with the output device of the navigation system;
waiting to receive a signal indicative of user input for a finite predetermined answering time period; and
determining that the output of guidance information by the output device of the navigation system should be suspended in response to no receipt of the signal indicative of user input within the answering time period.

12. The method of claim 1, where outputting a prompt for user input comprises outputting at least one of visual information or acoustic information, and the signal indicative of user input is received in response to receipt of acoustic information from the user.

13. The method of claim 1, where suspending the output of guidance information with the output device of the navigation system comprises suspending displaying of the calculated route to the destination on a map and suspending an output of driving instructions.

14. The method of claim 1, where the output device of the navigation system comprises a display, and outputting the estimated arrival time with the output device of the navigation system comprises displaying the estimated arrival time at the destination on the display of the navigation system based on the calculated new route.

15. The method of claim 1, further comprising the steps of:
receiving a signal indicative of a command from the user to terminate suspension of the output of guidance information with the output device of the navigation system; and
outputting, in response to the received signal, guidance information with the output device of the navigation system to guide the user along the calculated new route.

16. The method of claim 1, where outputting a prompt for user input comprises outputting a prompt whether the route ahead is blocked.

17. The method of claim 1, where outputting a prompt for user input comprises outputting a prompt whether leaving the calculated route is intended.

18. A navigation system comprising:
a positioning unit adapted to determine a current position of a navigation device of the navigation system;
a user interface adapted to output information for receipt by a user of the navigation system and to receive signals indicative of information from the user; and
a processing unit adapted to calculate a route to a destination, to generate and output guidance information for guiding the user along the calculated route, to determine, based on the current position of the navigation device, if the user is leaving the calculated route, and to prompt the user, in response to determining that the user is leaving the calculated route, whether output of guidance information by the navigation system should be suspended;
where, in response to receipt of a signal indicative of confirmation from the user that the output of guidance information by the navigation system should be suspended, the processing unit is adapted to suspend the output of guidance information by the navigation system, to calculate a new route to the destination based on the current position of the navigation device, to calculate an estimated arrival time at the destination based on the calculated new route, and to output the estimated arrival time.

19. The navigation system of claim 18, where, in response to receipt of the signal indicative of confirmation from the user that the output of guidance information by the navigation system should be suspended, the processing unit is adapted to suspend the output of guidance information by the navigation system for a finite predetermined time period.

20. The navigation system of claim 18, where the navigation device comprises a mobile personal navigation device or a navigation device of a vehicle.

21. A tangible non-transitory computer readable medium comprising a plurality of instructions executable by a processor, the tangible computer readable medium comprising:
instructions executable to calculate a route to a destination;

instructions executable to output guidance information with an output device of a navigation system, the guidance information adapted to guide a navigation device of the navigation system along the calculated route;

instructions executable to determine, based on a current position of the navigation device, whether the navigation device has left the calculated route;

instructions executable to output a prompt, in response to determining that the navigation device has left the calculated route, asking whether output of the guidance information should be suspended;

instructions executable to suspend the output of guidance information in response to determining that the output of guidance information should be suspended;

instructions executable to calculate a new route to the destination substantially concurrently with suspension of the output of guidance information;

instructions executable to calculate an estimated arrival time at the destination based on the calculated new route; and instructions executable to output the estimated arrival time substantially concurrently with suspension of the output of guidance information.

22. The tangible non-transitory computer readable medium of claim 21, where the instructions executable to suspend the output of guidance information are executable to suspend the output of audible guidance information and to continue the output of visual guidance information.

23. The tangible non-transitory computer readable medium of claim 21, further comprising instructions executable to recalculate the estimated arrival time at the destination in response to a change in the current position of the navigation device, and instructions executable to update the outputted estimated arrival time white the output of guidance information is suspended based on the recalculated estimated arrival time at the destination.

24. The tangible non-transitory computer readable medium of claim further comprising instructions executable to display a map of a surrounding area of the current position of the navigation device while the output of guidance information is suspended.

* * * * *